Dec. 22, 1959  W. E. FOLKERTS  2,917,938
POWER STEERING APPARATUS
Filed July 21, 1955  4 Sheets-Sheet 1
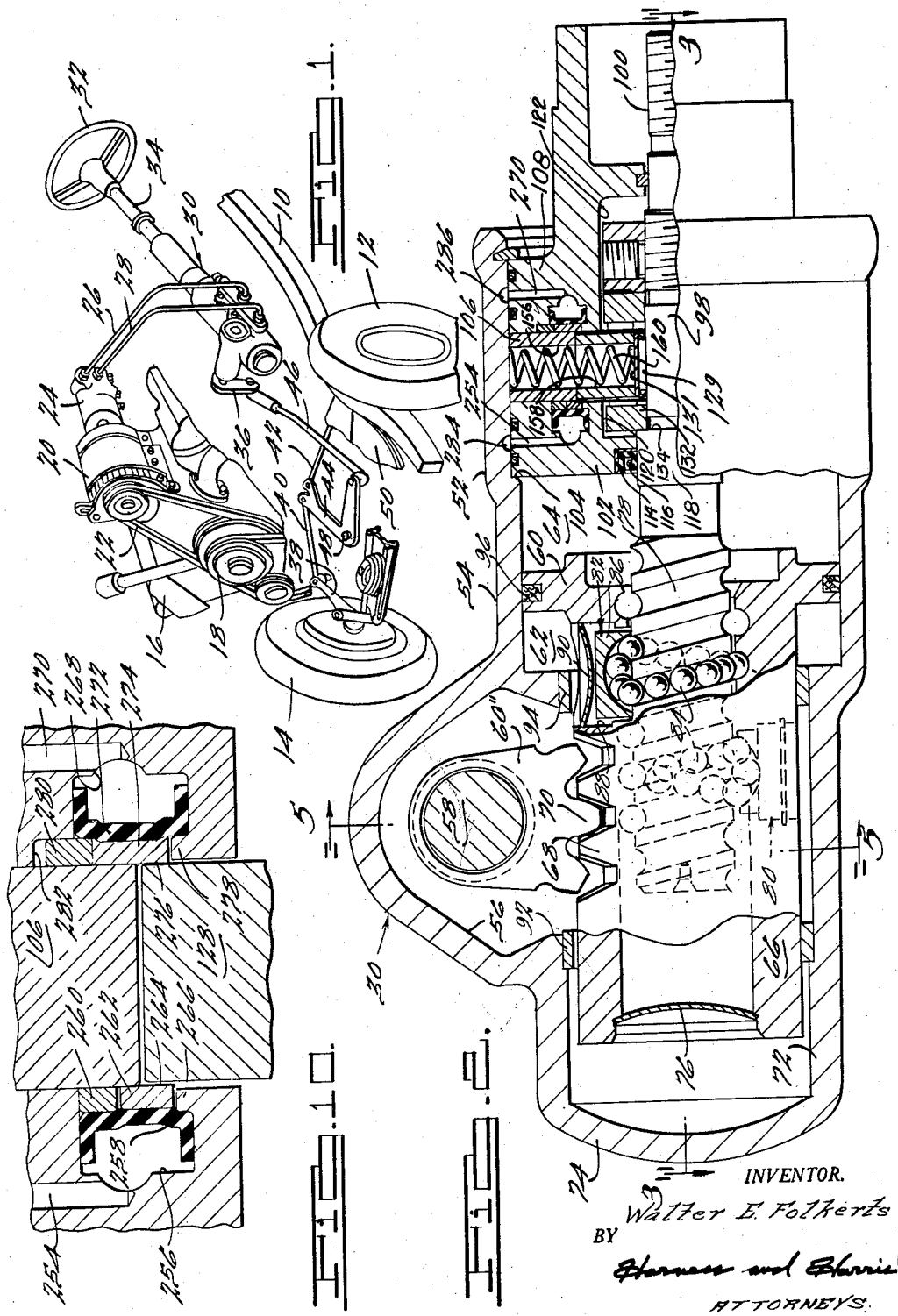
INVENTOR.
Walter E. Folkerts
BY
Harness and Harris
ATTORNEYS.

Dec. 22, 1959 W. E. FOLKERTS 2,917,938
POWER STEERING APPARATUS
Filed July 21, 1955 4 Sheets-Sheet 2
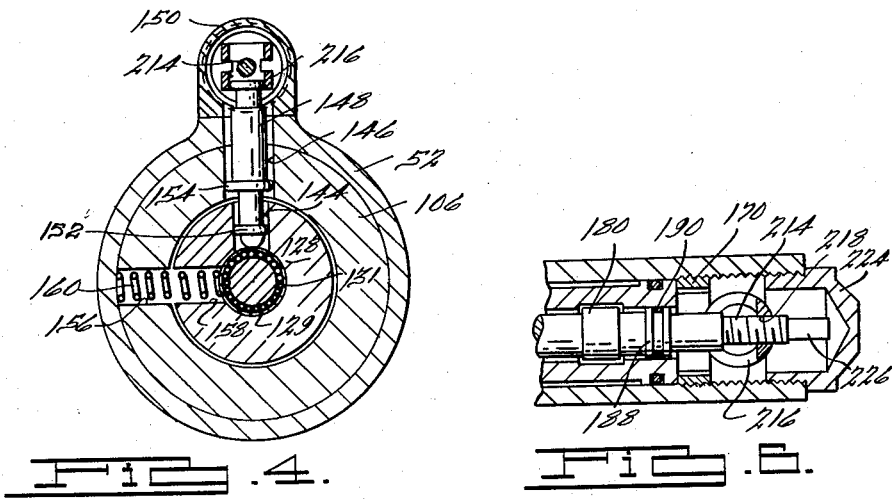
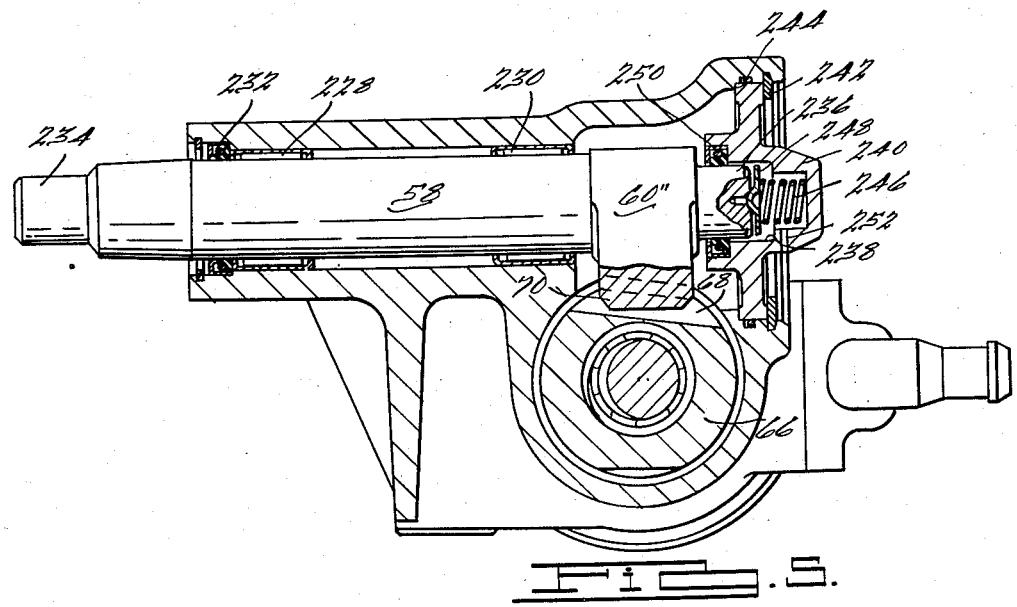
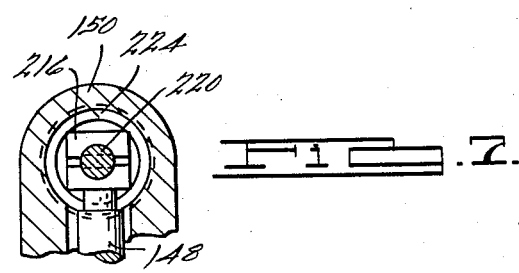
INVENTOR.
Walter E. Folkerts.
BY
Harness and Sherice
ATTORNEYS.

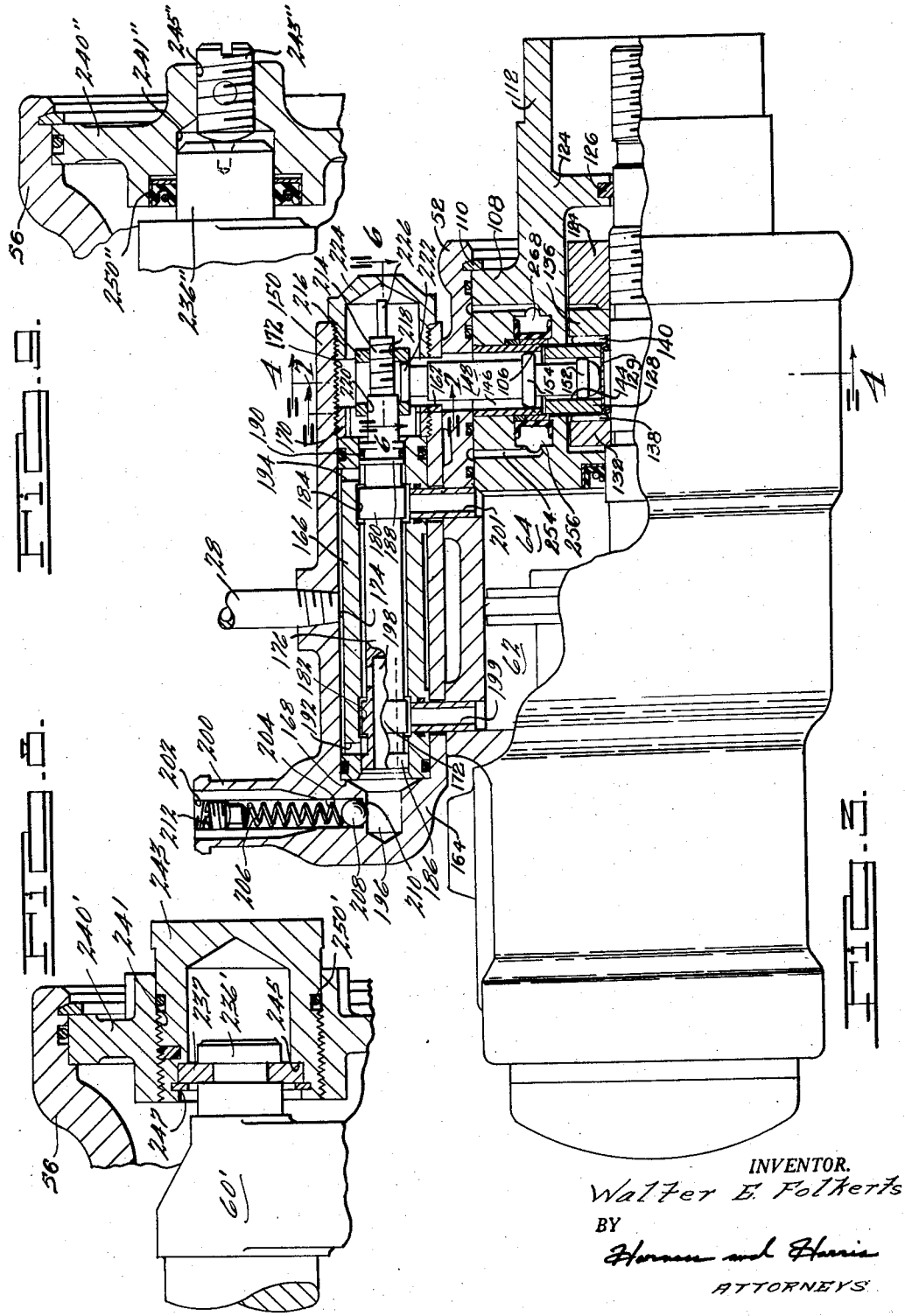

Dec. 22, 1959  W. E. FOLKERTS  2,917,938
POWER STEERING APPARATUS
Filed July 21, 1955  4 Sheets-Sheet 4

INVENTOR.
Walter E. Folkerts.
BY
ATTORNEYS.

2,917,938

POWER STEERING APPARATUS

Walter E. Folkerts, Hazel Park, Mich., assignor to Chrysler Corporation, Highland Park, Mich., a corporation of Delaware Application July 21, 1955, Serial No. 523,603

26 Claims. (Cl. 74—388)

My invention relates generally to steering gear mechanisms for motor vehicles or the like and more particularly to a new and improved power steering mechanism capable of providing improved directional control of the dirigible wheels of a wheeled vehicle.

It is well known at the present stage in the development of the power steering art to provide a hydraulic power boosting mechanism for use with a geared connection between a manually controlled steering shaft and the vehicle wheels to supplement the required manual steering effort. These mechanisms normally include a fluid motor having a piston and cylinder assembly, a piston rod connected to the piston to transmit power from the same to a driven element, and a hydraulic pressure control means for distributing pressure from a suitable fluid pressure source to either side of the piston for energizing the mechanism. The control valve means normally comprises a movable valve element operatively connected to a manually operated driving element, said valve element being adapted to selectively distribute the working fluid pressure from the pressure source to one side or the other of the piston as determined by the steering requirements while simultaneously accommodating the exhaust flow of fluid from the opposite side of the piston. The control valve may also be effective to vary the magnitude of the fluid working pressure acting on the piston so that the working force is proportional to the resistance offered by the wheels to directional variations.

In general, these power steering mechanisms of known constructions are complex in design and difficult and expensive to manufacture in quantity by reason of the close manufacturing tolerances required, the large number of component parts, and the difficulty in assembly. In addition, the size of the power steering mechanisms of known construction is often undesirably large. They are also often characterized by a high degree of backlash or "free play" between the driving and driven portions of the unit and by a relatively high degree of undesirable mechanical friction between the relatively movable elements.

It is an object of my instant invention to provide an improved power steering mechanism which avoids the above mentioned shortcomings of the prior art devices while at the same time providing improved performance during operation.

A further object of my invention is to provide a power steering mechanism which is characterized by a new and unique fluid motor and control valve arrangement having an improved and reliable mode of operation.

A further object of my invention is to provide a power steering mechanism as set forth in the preceding object wherein the control valve is characterized by its increased sensitivity to the manual effort exerted on the manually operable driving portion of the mechanism.

It is a further object of my invention to provide an improved power steering mechanism as above set forth wherein the fluid motor portion thereof is characterized by an improved piston and piston rod construction.

It is a further object of my invention to provide an improved power steering mechanism as mentioned in the preceding object wherein the piston of the fluid motor is capable of being subjected to an effective fluid working pressure over a greatly increased working area on either side thereof thereby making possible a reduced overall transverse dimension.

It is a further object of my invention to provide a power steering mechanism of reduced transverse dimension as set forth in the preceding object wherein the constituent elements are arranged to provide a minimum longitudinal dimension for any given adaptation.

It is a further object of my instant invention to provide a power steering mechanism of the type above mentioned wherein the control valve means is adapted to be adjusted to its proper operating position from the exterior of the mechanism without the need for disassembly.

It is a further object of my instant invention to provide a power steering unit of the type set forth above which is capable of being conveniently serviced.

It is a further object of my instant invention to provide a power steering mechanism as above set forth wherein mechanical friction between the relatively movable component elements is reduced to a minimum.

It is a further object of my invention to provide an improved fluid motor for a power steering mechanism of the type mentioned above wherein the piston rod thereof is threadably connected to the piston and wherein means are provided for eliminating backlash at the threaded connection.

It is another object of my instant invention to provide a power steering mechanism wherein a new and improved means is provided for obtaining a steering resistance to the movement of the manually operable driving portion of the mechanism which is proportional to the resistance offered by the driven portion of the vehicle during operation, said resistance providing the vehicle driver with a normal steering sensation or pressure reaction "feel back."

It is a further object of my invention to provide a power steering mechanism as set forth in the preceding object wherein the steering sensation experienced by the vehicle driver is the same during turning maneuvers of the vehicle in either direction.

Many other objects and features of my instant invention will readily become apparent from the following description and from the accompanying drawings.

By way of a general description of certain of the principal features of my instant invention, it will become apparent that the fluid motor portion of the mechanism is comprised of an external housing defining a cylindrical chamber within which the fluid motor piston is slidably disposed. By preference the outer casing is comprised of a one-piece casting which may be divided into two opposed working chambers by the piston member. A gear rack is formed on an axial extension of the piston member and a gear sector, which is carried by a suitable rocker arm for the vehicle steering linkage assembly, is situated within the casing in engagement with the gear rack. The piston may be formed with a central threaded opening and a manually actuated driving shaft may extend axially within the opening with one end terminating within the interior of the piston and with the other end extending to the exterior of the casing to accommodate a connection with a usual type of manually operable steering shaft. Recirculating balls may be disposed within the externally formed threads on the driving shaft and in the internally formed threads in the piston for providing a driving connection between the piston and the driving shaft. The piston and driving shaft thereby form a recirculating ball-nut assembly in which the above described balls are arranged in two axially spaced circuits. This novel connection between the piston and the driving shaft is such that the effective working area on either side of the piston is substantially equal to the transverse cross sectional area of the cylinder.

The driving shaft may be side loaded by a suitable spring means to slightly misalign the axis of the piston rod with respect to the axis of the piston thereby creating a force couple in the vicinity of the recirculating ball-nut connection between the piston rod and the piston, the forces constituting the couple acting at each of the axially spaced ball circuits. This feature tends to eliminate undesirable backlash in the recirculating ball-nut connection.

The above mentioned control valve means may be situated on the outer side of the casing and it may comprise a movable valve element and porting for accommodating the distribution of fluid pressure from an external source to either of the above mentioned pressure chambers. The movable valve element is mechanically coupled to the driving shaft and is actuated as the latter is rotated by the manually operable steering shaft. Means are provided for accommodating a lost motion of the driving shaft in the axial direction so that when a turning force is applied thereto, it may shift in either one direction or the other depending upon the direction of the applied torque. The lost motion of the driving shaft is transferred to the movable valve element through the mechanical connection therebetween, the displacement of the valve element being considerably greater than the displacement of the piston rod. This displacement multiplication results in a fast acting and highly sensitive valve means and is accomplished by reason of the mechanical advantage inherent in the connection between the movable valve element and the driving shaft.

Hydraulic pressure reaction members are positioned adjacent the above described connection between the movable valve element and the piston rod with portions thereof being adapted to act upon the driving shaft to resist the above described lost motion, the latter effecting the control valve operation as above described. Fluid pressure from the working chambers may be conducted to either of a pair of reaction chambers situated adjacent the above described reaction elements to energize the latter and the magnitude of the resistance to the above described lost motion is proportional to the magnitude of the fluid pressure within the working chambers, the latter in turn being proportional to the magnitude of the steering resistance.

A back pressure valve means of novel construction is also provided for limiting the magnitude of the pressure build up within the above described reaction chambers thereby preventing an excessive resistance to manual operation of the steering shaft during parking maneuvers of the vehicle.

The above described gear sector and rocker arm are situated within the casing so that they are exposed to the pressurized fluid within one of the working chambers. The resulting hydraulic pressure force exerted on the rocker arm is utilized to accomplish an automatic gear tooth adjustment to eliminate backlash between the gear sector and the gear rack.

For the purpose of more particularly describing the above as well as other important features of my invention, reference will be made to the accompanying drawings wherein:

Figure 1 is a general schematic assembly of a portion of a vehicle chassis showing one suggested means for installing the power steering mechanism of my instant invention in a conventional automobile steering system;

Figure 2 is a longitudinal sectional view of the power steering mechanism of my instant invention;

Figure 3 is another longitudinal sectional view of the power steering mechanism of my instant invention including the control valve means therefor and is taken along section line 3—3 of Figure 2;

Figure 4 is a transverse sectional view of the power steering mechanism of my instant invention and is taken along section line 4—4 of Figure 3;

Figure 5 is a transverse sectional view of the mechanism showing the automatic sector gear tooth adjustment and is taken along section line 5—5 of Figure 2;

Figure 6 is a detailed sectional view showing a portion of a means for connecting the movable valve element to the piston rod and is taken along section line 6—6 of Figure 3;

Figure 7 is another detailed sectional view showing the structure of Figure 6 and is taken along section line 7—7 of Figure 3;

Figures 8 and 9 are detailed sectional views showing two additional modifications of the automatic sector gear tooth adjusting means;

Figure 10 is an enlarged view of the hydraulic reaction means for obtaining the manual steering sensation during operation as briefly described above;

Figure 11:
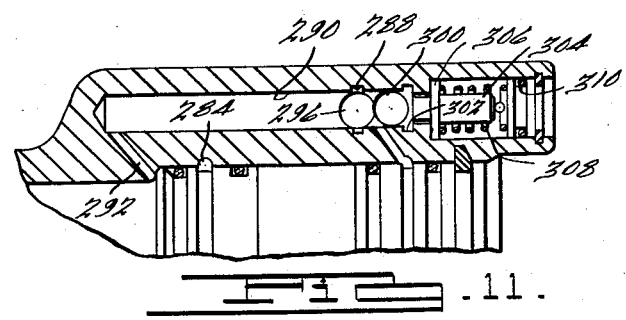
Figure 11 is a detail view of the valve means for limiting the steering resistance during parking.

Referring first to the schematic view of Figure 1, I have shown a conventional vehicle frame side rail 10 and a pair of dirigible vehicle wheels 12 and 14, the latter being suspended by a conventional suspension mechanism at the forward portion of the frame. The vehicle engine is shown at 16 and it comprises a crankshaft driven compound sheave 18 which is drivably connected to the armature shaft of the generator 20 by a belt 22. The generator armature shaft may be drivably coupled to the input shaft of a positive displacement power steering pump 24, the latter being connected through high pressure and low pressure fluid conduits 26 and 28 respectively, to the power steering mechanism of my instant invention shown generally by reference character 30.

The power steering mechanism 30 forms an integral portion of the vehicle steering system which also comprises a steering wheel 32, a steering column post 34 within which a manually operable steering shaft is disclosed, a pitman arm 36 adapted to be oscillated in either direction during turning maneuvers of the vehicle, a pair of steering arms for the vehicle wheels 12 and 14, one of said arms being designated by numeral 38, connecting rods 40 and 42 for drivably connecting the steering arms with a bell crank member 44, and a drag link 46 for connecting one end of the bell crank 44 to the pitman arm 36. The bell crank 44 may be pivoted at 48 to a frame cross member partly shown at 50.

Referring next to Figure 2, the power steering mechanism 30 comprises an outer casing 52 which, by preference, is of a one-piece cast construction. Casing 52 is generally cylindrical in shape and it defines a central working chamber section 54. Casing 52 is further formed with an upper chamber 56 which is adapted to receive a rocker shaft 58, the latter being transversely disposed within the chamber 56 as shown. A gear sector 60'' is carried by the rocker shaft 58. The rocker shaft 58 extends to the exterior of the casing 52 and has secured thereto the aforementioned pitman arm 36 as seen in Figure 1.

A piston 60 is slidably positioned within the cylindrical section 54 of the casing 52 so as to define a pair of opposed working chambers designated by reference characters 62 and 64 respectively. Piston 60 includes an axially extending hollow portion 66, said extension being disposed in a direction transverse to the rocker shaft 58. The top side of the piston extension 66 is provided with gear rack teeth 68 which drivably engage mating gear sector teeth 70 formed on the gear sector.

The piston extension 66 is enclosed by a casing portion 72 which defines a hollow enclosure communicating with the working chamber 62 and the interior of the casing portion 56. Casing portion 72 is closed by an end closure wall 74.

The end of the hollow interior of the piston extension 66 may be closed by a closure plate 76 which, by preference, is secured in place as shown by means of a pressed fit although other closure means may also be provided for this purpose if desired. Approximately one-half of the axial length of the piston 60 with its extension 66 may be formed with an internal helical thread, said thread being of semi-circular cross section as indicated. An externally threaded shaft 78 is adapted to be received within the hollow interior of the piston 60 and its extension 66 and a pair of spaced recirculating ball circuits is provided for operatively connecting the shaft 78 with the piston assembly. The pair of circuits above mentioned are generally identified in Figure 2 by numerals 80 and 82 and they comprise spherical balls 84 which, together with the internally threaded piston assembly and the externally threaded shaft 78, form a recirculating ball-nut assembly, the balls 84 being received within the semicircular helical threads on the shaft 78 and in the hollow interior of the piston assembly.

It may be observed in Figure 2 that the balls of each circuit circulate about the shaft 78 during rotation of the latter and the individual balls 84 of each circuit may pass from one thread or groove to an axially adjacent thread or groove by means of a bridge member or guide 86, one such bridge member or guide being illustrated in Figure 2 in cross section. The bridge members 86 are received within radially extending openings 88 formed in the wall of the piston extension 66 and retained therein by closure members 90 which, by preference, are held in place by means of the frictional engagement between their periphery and the walls of the openings 88.

Sufficient clearance is provided between the end of the threaded shaft 78 and the end of the closure member 76 for the piston extension 66 to accommodate a considerable amount of relative movement between the shaft 78 and the piston member. By preference, a pair of spaced pilot rings 92 and 94 are provided within the casing portion 72 to facilitate assembly and to maintain alignment. A packing ring 96 may be disposed about a peripheral groove on the piston member 60 to provide a sealing engagement between the piston member and the end wall of the cylinder casing portion 54. The shaft 78 includes an axially extending portion 98 which extends to the exterior of the generally cylindrical casing 52, the extended end of the shaft portion 98 being threaded at 100 to facilitate a connection with the manually operable steering shaft associated with the above mentioned steering wheel 32. A multiple piece closure assembly for the casing 52 is shown in Figures 2 and 3. This closure assembly comprises a first wall member 102 and is disposed across the interior of the casing 52 and in engagement with a peripheral shoulder 104 formed about the inner periphery of the hollow interior of the casing 52. A circular spacer ring member 106 is positioned about the inner periphery of housing portion 72 in axial engagement with the wall 102 and an outer wall member 108 is positioned in axial engagement with the other side of the spacer ring member 106 and is retained in a fixed axial position by a snap ring and groove 110. The wall member 108 is provided with an extended portion 112 to facilitate the mounting of the power steering assembly to a fixed portion of the body structure of a vehicle with which the unit is adapted to be used.

The shaft portion 98 is adapted to extend through the above described closure assembly, the wall portion 102 being centrally apertured at 114 for this purpose. A fluid seal 116 may be received within the aperture 114 and it may sealingly engage a sealing surface 118 formed on the shaft 78. Wall members 102 and 108 are formed with relatively large diameter openings 120 and 122, said openings being in coaxial relationship with respect to the axis of shaft 78. The extension 112 of the wall 108 may be formed with an inwardly directed flange 124 which may be centrally apertured to receive the extended end of the shaft portion 98. A suitable packing material 126 may be used to effect a sealing contact with the flange 124 and the shaft portion 98.

A centrally apertured circular adaptor 128 is disposed about the shaft portion 98 and is rotatably journalled thereon by needle bearing 129, the latter being received in a cylindrical race 131. The outer periphery of the adaptor 128 is radially spaced from the inner periphery of a spacer member 106. By preference this radial spacing may be as much as .010 or .012 inch although another spacing could also be provided if desired.

A first centrally apertured spacer 132 may be positioned within the opening 120 in the wall member 102 about the shaft portion 98 in axial engagement with a shoulder 134 formed adjacent the sealing surface 118. A second centrally apertured spacer 136 may be positioned on the other side of the adaptor 128 within the opening 122 formed in the wall member 108. These spacers 132 and 136 are adapted to function as radial needle bearing races for axially positioning the adaptor 128. A series of needle bearing elements 138 and 140 are respectively positioned between the spacers 132 and 136 and the adaptor 128. The radial needle bearings 138 and 140, together with their respective races 132 and 136, are adapted to axially position the adaptor 128. A nut member 142 is threadably received on the shaft portion 98 for maintaining the adaptor 128 and its associated needle bearings in axially stacked relationship.

Referring next to Figures 3 and 4, it may be observed that the circular adaptor 128 is provided with a radially extending opening 144 which communicates with a radially extending opening 146 formed in the spacer member 106. A valve actuating element 148 is received within the openings 144 and 146 and it extends outwardly from the casing 52 into the interior of a valve casing 150, the latter being secured to the side of the casing 52 as shown. Valve actuating shaft 148 is provided with a circular bearing shoulder 152 having a crowned peripheral edge which is in contact with the inside of the radial opening 144. Similarly, a bearing shoulder 154 is formed on the valve actuating element 148 at an intermediate point and the peripheral edge of the shoulder 154 is crowned to accommodate angular movement of the actuating element 148 with respect to the central axis of the aligned openings 144 and 146. The crowned shoulder 154 on the element 148 is adapted to engage the sides of the opening 146. The radially inward end of the actuating element 148 contacts the race 131 for the needle bearing 129.

The spacer member 106 and the adaptor 128 are also provided with aligned radial openings 156 and 158 and a compression spring 160 is situated within these openings. The spring 160 is seated on the interior wall of the outer casing 52 and on the needle bearing race 131. I contemplate that the openings 156 and 158 will extend radially toward the side of the casing 52 on which the casing portion 30 is formed.

In the alternative, the opening 156 might be omitted and a spring might be inserted in the opening 158 with one end seated on the needle bearing race 131 and with the other end seated on the inner periphery of the spacer 106. In still another alternative construction, the opening 158 might be omitted and a spring might be inserted in the opening 156 with one end seated on the inside wall of the casing 52 and with the other end seated on the outer periphery of the adaptor 128. The function of the spring 160 is to bias the shaft 78 in a transverse direction to reduce "free play" or backlash in the reciprocating ball-nut assembly. This unit will subsequently be explained in more detail in the statement of the operation of the invention. To permit the ball elements 84 of the recirculating ball circuits 80 and 82 to pass through the bridge member or guides 86, the spring 160 should be located substantially in a plane which contains the axis of the opening 88. Also, the spring 160 should be arranged so that the force exerted thereby in the shaft 78 will tend to increase the clearness between the helical threads on shaft 78 and the helical threads in the piston assembly in the vicinity of the bridge or guides 86.

Referring next to the valve housing 150 and its associated components as shown in Figure 3, the aforementioned valve actuator shaft 148 extends through an opening 162 formed in the valve housing 150. The valve housing 150 is substantially cylindrical in shape and is formed with a closed end 164. A hollow valve sleeve element 166 is received within the interior of valve housing 150 and it engages at one end thereof a shoulder 168 formed about the interior of the housing 150. Valve sleeve element 166 is held in position by an externally threaded stop 170 threadably received within an internally threaded portion 172 at the other end of the valve housing 150. The intermediate section of valve sleeve element 166 is provided with an annular recess 174 which communicates with the fluid pressure supply conduit 28 extending to the discharge side of the pump 24 as above described.

A spool valve element 176 is slidably positioned within the hollow interior of sleeve element 166. Spool valve element 176 is provided with a spaced pair of valve shoulders 178 and 180 which are situated in operative relationship with respect to annular valve grooves 182 and 184, respectively, the latter being formed in sleeve element 166. An end shoulder is formed adjacent each valve shoulder 178 and 180 as indicated at 186 and 188 respectively, the latter being provided with a peripheral groove for receiving a suitable O-ring or other suitable sealing element 190.

The space between the shoulders 178 and 186 communicates with the recess 174 through a port 192 and the space between the shoulders 180 and 188 communicates with recess 174 through a port 194. The space between the valve shoulders 178 and 180 communicates with an end chamber 196 formed within the valve casing 150 through an exhaust passageway 198. The chamber 196 in turn communicates with the low pressure exhaust conduit 26 above mentioned. The recess 182 communicates with the fluid working chamber 62 within the main casing 52 by means of a conduit 199 which may be comprised of a tubular sleeve insert to effect a fluid tight connection between the valve chamber and working chamber 62. Similarly the recess 184 may communicate with the working chamber 64 by means of conduit 201 which is defined by a tubular sleeve insert similar to that associated with conduit 199.

By preference, the exhaust conduit includes a fitting 200 which is internally threaded as shown at 202 and which is provided with a central opening 204 for receiving the back pressure spring 206. The spring 206 is seated upon a back pressure valve ball element 208 which in turn is normally biased into engagement with a valve shoulder 210. The other end of the spring 206 may be seated on an adjustable spring seat member 212 threadably received within the threaded portion 202.

The spool valve element includes a threaded extension 214 which may be threadably received within a substantially circular coupling member 216, said coupling member being provided with a threaded opening 218 for this purpose. An unthreaded opening 220 is formed in coupling member 216 in axial alignment with opening 218 for the purpose of accommodating the shaft extension 214. The member 216 may be separated along a line passing through the center of the opening 220 and the shaft extension 214 may then be frictionally engaged by the sides of the opening 220 by applying a clamping force to the member 216.

The extended end of the valve actuator element 148 may be formed with a head 222 received within the interior of the circular coupling member 216.

The threaded end of the valve housing 150 receives the threaded closure member 224 which may be conveniently removed to permit axial adjustment of the spool valve element 176 with respect to the valve actuator element 148, a suitable extension 226 being provided to facilitate such an adjustment.

Referring next to Figure 5, the sector gear 60″ and the rocker shaft 58 may be seen in more particular detail. The housing portion 30 surrounding the sector gear and rocker shaft is sufficiently long to permit the rocker shaft 58 to be rotatably supported within a pair of spaced needle bearing assemblies 228 and 230. The extended end of the rocker shaft 58 protrudes from the end of the hollow portion 30 and is sealed by a suitable sealing structure 232. The terminal portion of the rocker shaft 58 is externally splined as shown at 234 to accommodate a driving connection with the above mentioned pitman arm 36. The other end of the rocker shaft 58 is formed with a relatively reduced diameter portion 236 which may be received within an aligned opening 238 formed in an end closure plate member 240, the latter being transversely disposed across the end opening of the casing portion 56 and secured in place by means of a snap ring 242 with the peripheral edge thereof engaging an internal annular shoulder 244 formed in the housing portion 30.

The opening 238 encloses a compression spring 246 which is seated on a spring seat member 248, the latter being centrally deformed to provide an approximate point contact with the end of the rocker shaft portion 236. The spring 246 is adapted to normally bias the rocker shaft 58 and the sector gear 60″ in an axial direction so that the sector gear teeth 70 will tend to be positively engaged at all times with the rack gear teeth 68. The teeth 68 and 70 may be tapered to provide such a "take up" feature. The tapered configuration of teeth 68 and 70 may be accomplished by varying the teeth thickness and the tooth addendum from one axial side of the tooth to the other.

A seal 250 is mounted as shown about the reduced diameter shaft portion 236 to prevent fluid leakage into the opening 238. A vent 252 is formed within the opening 238 and the exterior of the casing.

In Figure 8 I have shown an alternative construction for providing a manual "take up" feature and in Figure 9 I have shown still another form for effecting the takeup of the backlash which may occur in the gear rack and sector gear assembly. In Figure 8 the extended portion 236′ of the rocker arm may be peripherally grooved to receive an anchor ring 237 as shown. An end closure plate member 245 may be secured within the housing portion 56 and it is provided with a central threaded opening 241. A manually adjustable threaded member 243 is threadably received within the opening 241 with a portion thereof surrounding the reduced diameter portion 236′ of the rocker shaft. The anchor ring 237 may be situated in contact with a shoulder 245 and may be held in engagement therewith by snap ring 247. The gear sector shown at 60′ may be axially positioned upon rotation of the member 243 until the backlash in the assembly has been compensated for. A packing 250′ may be positioned in an annular groove formed about the adjustable member 243 to prevent fluid leakage from the interior of the unit.

The construction shown in Figure 9 is somewhat similar to that of Figure 8 and it includes a still further modified closure plate member shown at 240″ which is received within the housing portion 56. The rocker shaft is provided with a reduced diameter end portion 236″ which is received within a central recess 241″.

A suitable seal structure 250″ may be provided as shown about the reduced diameter shaft portion 236″ in sealing engagement therewith and in sealing engagement with the surrounding opening in the closure plate 240″. A central threaded opening 245″ may be formed in the end closure plate member 240″ and a threaded element 243″ may be received therein, said element 243" axially engaging the end of the reduced diameter shaft portion 236". The element 243" may be manually adjusted in an axial direction by a suitable hand tool to eliminate the backlash in the gear rack and sector gear assembly.

For the purpose of describing the hydraulic "feel back" feature mentioned above in the statement of the objects of the invention, reference may be made to Figures 2, 3, and 10. The closure plate member 102 is provided with a fluid pressure passage 254 which communicates with an annular groove 256 formed on the side of the plate member 102 adjacent the spacer member 106. A flexible seal 258 is disposed in the groove 256 and a backup ring 260 may be positioned between the spacer member 106 and one portion of the seal 258. A second backup ring 262 is positioned between the seal 258 and the spacer member 106 and is adapted to overlap the adjacent peripheral edge of the adaptor 128, said ring 262 contacting the central section of seal 258 as shown. It is apparent from Figure 10 that a lost motion gap shown at 264 is provided between the backup ring 264 and the adjacent adaptor 128. The backup ring 264 may be substantially centrally positioned with respect to the seal 258 by means of a shoulder 266 formed about the inner edge of the peripheral groove 256. A similar groove 268 is formed in the other closure plate member 108 and it communicates with a hydraulic pressure passage 270 as indicated. A flexible seal element 272 is positioned within the groove 268 and a backup ring 274 is positioned between the spacer member 106 and the central portion of the seal 272. The backup ring 274 overlaps the peripheral edge of the adaptor 128 and a lost motion gap 276 is formed between the backup ring 274 and the adaptor 128. The backup reaction ring 262 is smaller than the backup reaction ring 274 for reasons which will subsequently become apparent from the statement of the operation of the unit.

By preference, lost motion gaps 264 and 276 may be about .008 of an inch. The backup ring 274 may be centrally positioned with respect to seal 272 by means of peripheral shoulder 278 formed about the inner periphery of the groove 268. Another backup ring 280 may encircle the backup ring 274 and may be interposed between the spacer member 106 and the adjacent surface of the closure plate member 108, the latter being recessed at 282 to receive the backup ring 280.

Figure 12:
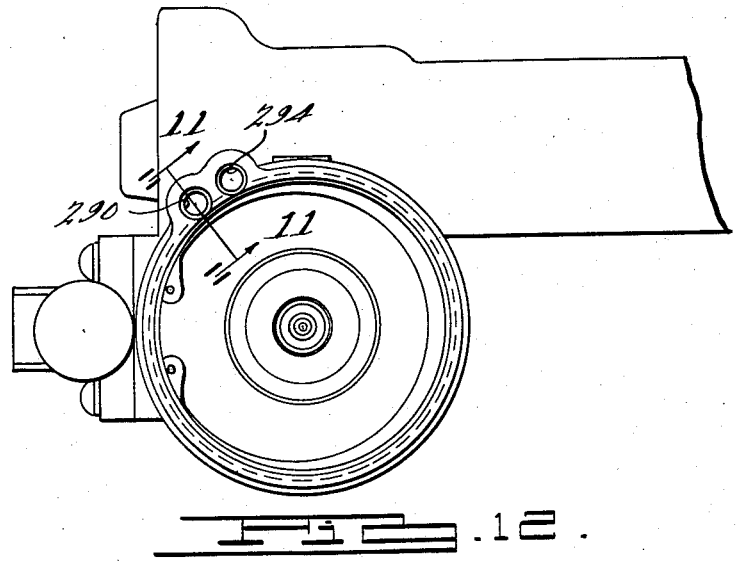
Figure 12 is an end view of the power steering unit showing the position of the valve means of Figure 11.

The above mentioned hydraulic pressure passage 254 communicates with a groove 284 formed about the interior of the casing portion 52 as indicated in Figures 2, 3, and 11. Similarly, the hydraulic pressure passage 270 communicates with a groove 286 formed within the casing 52 in axially spaced relationship with respect to the groove 284. The groove 286 communicates with a passage 288 which extends to the axially extending bored opening 290 formed in an external enlarged section on the exterior of the casing 52, said section being best seen in Figure 12. The bored opening 290 communicates with the working chamber 64 through a branch passage 292 as indicated in Figure 11. A similar bored opening 294, as viewed in Figure 12, may be provided for accommodating the delivery of the pressure from the working chamber 62 to the groove 284 and the hydraulic pressure passage 254. The details of the construction of the bored opening 294 and its associated branch passages will not be described since it is substantially similar to that shown in Figure 11.

Referring again to Figure 11 the bored opening 290 is adapted to be pressurized by the working pressure in the working chamber 64 and this working fluid is in turn conducted to a chamber defined by the groove 268 and the closure plate member 108. For the purpose of limiting the pressure build up within the pressure passage 270 and its associated chamber, I have provided a pressure limiting valve mechanism which comprises a ball valve element 296 positioned adjacent a groove 298 in the opening 290. A second ball valve element 300 is positioned in adjacent relationship with respect to the ball valve element 296 and a second groove 302 is formed adjacent the ball valve element 300 as shown. The branch passage 288 extends through a space intermediate the ball valve elements 296 and 300 and fluid under pressure is adapted to pass through the bored opening 290 and around the first ball valve element 296 in the branch passage 298. The groove 298 is adapted to transfer the fluid pressure when the ball valve element 296 is in the position shown above. A plunger 304 is situated in the end of the bored opening 290 in contact with second ball valve element 300 and a shoulder 306 is formed on the plunger 304 to limit the extent of the axial movement of the plunger 304 in the lefthand direction as viewed in Figure 11. A spring 308 is provided as shown for biasing the plunger 304 into engagement with the ball valve element 300, said spring being seated upon a suitable insert 310.

During operation of the above described structure, the vehicle operator may rotate the shaft 78 of the recirculating ball-nut assembly comprised in part by the piston member 60 and by the spaced recirculating ball circuits 80 and 82, said rotation being accomplished by applying a steering effort to the steering wheel 32. During rotation of the shaft 78 in one direction the piston member 60 will tend to move to the right as viewed in Figure 2 thereby causing the sector gear 60 and the rocker shaft 38 to rotate in a counter-clockwise direction. This movement of the rocker shaft 38 is transferred to the dirigible wheels 12 and 14 through the above described steering linkage mechanism comprising in part pitman arm 36, connecting link 46, the crank 44, and the tie rods 40 and 42. This turning effort will be accompanied by an axial thrust in an axial direction, as viewed in Figure 2, which is transferred to the adaptor 128 through the radial needle bearing mechanisms 132 and 138. It may be observed in Figures 2 and 3 that the adaptor 128 is separated from the closure wall member 108 by a suitable lost motion gap and the adaptor 128 is thereby permitted to shift in an axial direction in response to the above described axial thrust exerted thereon by the shaft 78. The axial movement of the adaptor 128 in the righthand direction as viewed in Figures 2 and 3 will cause the valve actuator element 148 to pivot about its intermediate shoulder portion 154 since the radially inward end of the actuator element 148 will tend to follow the movement of the adaptor 128 by virtue of the positive contact provided by the shoulder 152. This movement of the valve actuator shaft 148 will be accompanied by movement of the spool valve element 176 in the lefthand direction as viewed in Figure 3 by reason of the coupling between the threaded end of the spool valve element and the upper end of the valve actuator shaft 148.

The distance between the radially inward end of the valve actuator 148 and the intermediate pivot shoulder 154 may be approximately one-third the distance between the shoulder 152 and the head 222 formed at the extended end of the actuator element 148. The displacement of the valve element for a given axial displacement of the shaft 78 will therefore be about three times that which could be obtained if no multiplication were provided. This greatly increases the sensitivity of the valve mechanism to movement of the shaft 78 and makes the unit as a whole more highly responsive to variations in the steering requirements. Also, the manufacturing tolerances between the cooperating valve parts of the control valve assembly are less critical and may be increased to facilitate manufacturing operations.

Upon movement of the spool valve element 176 in a left hand direction, high pressure fluid will then be allowed to pass from the high pressure conduit 28 into the annular recess 174 and then into the interior of the valve sleeve element 166. The valve land 180 will accommodate a transfer of high pressure fluid into the conduit 201 which in turn communicates with the working chamber 64 as above described. Valve land 180 is also effective to restrict the transfer of high pressure fluid from the port 194 into the space between the valve sleeve 166 and the intermediate section of valve element 176 and into the exhaust passage 198.

Upon movement of the valve element 176 as above described, the valve land 178 is effective to restrict the flow of fluid from the radial port 192 into the passage 199, the latter communicating with the working chamber 62 as above described. The valve land 178 is also effective to open the working chamber 62 to the exhaust passage 198. The flow of exhaust fluid passing from working chamber 62 is accommodated by the enlarged annular opening between the valve land 178 and the edge of the valve groove 182 formed in the valve sheet 166. It is therefore apparent that a pressure build up will occur in the working chamber 64 which will supplement the manual turning effort of shaft 78 to assist the vehicle operator in accomplishing turning maneuvers of the dirigible wheels 12 and 14. This power assist will continue as long as a steering torque is applied to the steering shaft 78 since this torque will be accompanied by an axial thrust which will effect the movement of the lower end of the valve actuator shaft 148.

Upon movement of the shaft 78 in the opposite direction, it will be apparent that the valve element 176 will shift in the opposite direction by reason of the oppositely directed axial thrust imparted to the shaft 78. During turning maneuvers of the vehicle as above described, pressure will be conducted to either one of the chambers defined by the annular grooves 256 and 268 depending upon the direction of the applied steering torque. If it is assumed that the piston member 60 moves in a left hand direction as viewed in Figure 2, the fluid pressure build up in working chamber 64 will be conducted to the chamber defined by groove 268 through the passages 270, 288 and 292, and by the bored opening 290. The pressure reaction force exerted on the circular ring 274 by reason of the pressure build up behind the seal 272 will oppose any relative axial shifting of the motion between the adaptor 128 and the fixed spacer member 106. This opposed thrust must then be overcome by the vehicle operator at all times during operation of the steering unit, the magnitude of this opposed thrust being proportional to the degree of pressure build up in the working chamber 64. Upon movement of the steering shaft 78 in the opposite direction, a pressure build up will occur in the chamber defined by the groove 256 by reason of the fluid connection between the latter and the working chamber 62, said fluid connection being defined in part by the passage 264. The opposed thrust exerted on the ring 262 will in this instance tend to oppose any relative motion in the opposite direction between the adaptor 128 and the fixed spacer member 106. It will be apparent that the pressure reaction upon the axially shiftable adaptor 128 will provide a pressure reaction "feel back" at the steering wheel 32 to give the vehicle operator a normal steering sensation, the magnitude of the "feel back" being proportional to the resistance offered by the dirigible wheel to directional variation.

An important feature of the above described "feel back" structure resides in the improved construction of the reaction chambers defined by the channel-shaped seals 258 and 272 and by the associated grooves 256 and 268 respectively. Relative sliding motion between the seals 258 and 272 and the closure plate members 102 and 108 is entirely absent. The hydraulic reaction force is transmitted directly to the adaptor 128 and the spacer member 106 through the rings 262 and 274, each of the latter engaging its associated seal at a substantially central location so that the center portion of the seal will deflect while the sides thereof may be urged into non-sliding sealing engagement with the walls of the respective grooves. It will therefore be apparent that the sensitivity and responsiveness of the control valve mechanism and the associated movable elements are greatly improved by reason of this friction-free construction.

The spring 160 is seated on the needle bearing race 131 and is effective to urge the adaptor 128 in a transverse direction to provide a slight cocking action of the steering shaft 78 thereby causing the axis of the shaft 78 to become slightly misaligned with respect to the axis of the piston 60 and its extension 66 as viewed in Figure 2. This cocking action will create a force couple in the reciprocating ball-nut assembly with one force of the couple acting through the ball circuit 82 on the piston member extension 66 in a downward direction and with the other force of the couple acting through the ball circuit 80 on the piston extension 66 in an upward direction. Any backlash which might exist due to manufacturing errors or to wear will be eliminated in this manner. The annular gap between the outer periphery of the spacer member 106 and the clearance between the shaft member 98 and the central openings in the closure plate members 102 and 108 accommodate this transverse movement.

The sector gear adjusting mechanism of Fig. 5 is effective to maintain an axial thrust on the rocker shaft 58 to maintain the sector gear teeth 70 and the rack gear teeth 78 in continuously engaged relationship, this thrust being produced in part by the spring 246. In addition, the rocker shaft 58 will be subjected to a hydraulic thrust by reason of the difference in cross sectional area between the intermediate portion of the rocker shaft 58 and that of the end portion 236. The interior of the housing portion 56 is continuously subjected to fluid pressure during operation of the unit and this hydraulic thrust is therefore always present.

I contemplate that under some circumstances the pressure build up within the interior of the housing portion 56 may exceed a desirable limiting value and it is conceivable that the thrust on the shaft 58 will cause the gear teeth 70 and 68 to fail prematurely and under these circumstances the manual adjustment means of Figure 8 may be employed. It will be observed that the annular ring 237 of the structure of Figure 8 is held by the shoulder 245 and by the snap ring 247 in a fixed position which will be varied as the pressure in the housing portion 30 is increased. The adjusted position of the gear sector 60' in the structure of Fig. 8 is determined solely by the degree of rotation by the manually adjustable member 243.

The adjustment of Figure 9 is somewhat similar in function to that of Figure 5 but it is even more simplified in that it lacks a spring for normally urging the sector gear teeth and the rack gear teeth into engagement. The operating position of the gear sector of Figure 9 may be adjusted by using a suitable hand tool or the like to rotate the threaded element 243". Thereafter, the gear sector will be urged into driving engagement with its associated gear rack by reason of the axial thrust exerted by the fluid pressure build up in the surrounding housing.

The spring loaded ball valve mechanism shown at 206, 208 and 210 is effective to maintain a predetermined back pressure on the exhaust side of the control valve mechanism. This back pressure tends to eliminate fluid pressure noises caused by fluid circulation during operation. These noises are believed to be due in part to fluid cavitation resulting from a rapid and localized pressure reduction in the fluid as it passes through the control valve assembly.

When the dirigible wheels 12 and 14 are turned when the vehicle is not moving or when the vehicle is being parked next to a curb, it may be undesirable to allow the pressure within the feel back reaction chambers defined by the grooves 256 and 268 to exceed a limited value. Since there is no particular advantage in allowing the resistance to the manual steering effort to vary proportionally to the steering resistance offered by the dirigible wheels under these specialized driving conditions, the back pressure regulator valve shown in Figure 11 functions to limit the pressure reaction build up to a desired value. During normal operation, fluid pressure is permitted to pass around the first ball valve element 296 and into the branch passage 288. It has been found that a pressure build up of approximately 300 pounds per square inch is desirable for a conventional steering wheel capable of being used with an automotive vehicle. Therefore, as the pressure build up in the working chambers of the fluid motor portion of the unit exceeds 300 pounds per square inch, the ball valves 296 and 300 are shifted to the right as viewed in Figure 11 until the ball valve element 296 contacts the edge of the groove 288 thereby blocking the branch passage 298. Simultaneously, the ball valve 300 is shifted until its center passes the adjacent edge of the groove 302 thereby allowing fluid within the reaction chamber defined by the groove 268 to exhaust into the cavity within which the spring 308 is situated. This cavity may be vented through a suitable drain hole or some other expedient may be used to conduct the fluid drained from the reaction chamber to the low pressure portion of the fluid circuit.

The valve element 176 may be conveniently adjusted to the desired operating position merely by removing the valve housing closure member 224 and then rotating the threaded end portion 214 of the valve element 176 by means of a suitable hand tool.

During manufacture of the unit, the adaptor 128 and a spacer member 106 may be easily ground to the desired axial dimensions simultaneously. No free play due to differences in the width of these components will then arise.

It will be observed that the working pressure which exists in either of the working chambers is free to act over the entire transverse area of the piston assembly. By way of contrast with fluid motors of known construction, the piston members of the prior art devices are fixed to a piston rod and the latter extends to the exterior of the fluid working chamber through a suitable fluid packing. Other types of fluid motors of known construction having opposed working chambers employ a piston rod which extends axially through both working chambers, a suitable fluid packing being provided at each axial end to the cylinder to accommodate the sliding movement of the piston rod. In these prior art devices, the effective working area of the piston is equal to the overall transverse area less the area of the piston rod.

Since the effective working area of the piston member of the unit of my instant invention equals the overall transverse area, no compensation for a piston rod being required, it is possible to reduce the size of the piston member thereby making possible an overall size reduction of the unit.

Other advantageous features of the unit of my instant invention reside in the single cast housing construction as compared to the multiple piece housing construction of many prior art devices. Also the weight of the unit is considerably less by reason of this reduced size and by reason of the reduction in the number of component parts. Also the high pressure delivery conduit and the low pressure exhaust fluid conduit are situated so that they may be positioned in side by side relationship or otherwise conveniently situated with a minimum of space requirements.

When the working chamber 64 becomes pressurized, the pressure reaction chamber defined by the groove 268 becomes pressurized thereby tending to oppose a shifting movement of the shaft 78 in a right hand direction as viewed in Figures 2 and 3. However, there is a tendency for the shaft 78 to be urged to the right when viewed in Figures 2 and 3 under the influence of the pressure which exists in the working chamber 64. This tends to oppose the hydraulic reaction force exerted to reaction ring 274 on the adaptor 128. By way of comparison, the shaft 78 is unaffected by an increase of hydraulic pressure within the working chamber 62 since shaft 78 is not directly exposed to the fluid within the working chamber 62. It is for this reason that reaction ring 274 is made with a larger effective area than that of reaction ring 262. The hydraulic "feel back" and the magnitude of the steering sensation transmitted to the vehicle steering wheel will therefore be equal during turning maneuvers in either direction. The effective area of the reaction ring 262 should be approximately equal to the effective area of the reaction ring 274 less the cross sectional area of the shaft 78 in the vicinity of the fluid seal 116.

Another feature of the steering mechanism of my invention resides in the unbalanced hydraulic loading of the spool valve element 176. It may be observed that the left end of the valve element 176 as viewed in Figure 3 is subjected to the back pressure of the fluid in the exhaust circuit whereas the other end of the valve element is sealed from fluid pressure by the sealing element 190. The valve element 176 will therefore be urged in the right hand direction as viewed in Figure 3 to maintain a constant loading on the valve actuator shaft 148 and the coupling means between the shaft 148 and the valve element 176. This hydraulic unbalance tends to eliminate free play in the valve linkage mechanism and substantially increases the sensitivity of the unit. In addition, the force exerted on the actuator shaft 148 tends to oppose the hydraulic force exerted on the piston shaft 78. It will thus be apparent that the hydraulic loading of the valve element 176 will supplement the balancing action of the hydraulic reaction chamber and the unequal reaction areas provided by the reaction rings 262 and 274.

Although I have particularly described a preferred embodiment of my invention, it is contemplated that many variations may be made thereto without departing from the scope of the invention as defined by the following claims.

I claim:

1. A power boosting mechanism comprising a cylinder, a piston member disposed within said cylinder to define a pair of opposed working chambers, a manually operable shaft threadably connected to said piston member, said manually operable shaft being adapted to shift axially between predetermined limits upon rotation thereof relative to said piston member, a valve housing positioned transversely with respect to said cylinder, a fluid pressure passage communicating with said valve housing with separate portions thereof extending to each working chamber, valve means including a valve element movably disposed within said housing for selectively distributing fluid pressure to said working chambers, means forming a mechanical connection between said movable valve element and said manually operable shaft, said mechanical connection including an axially shiftable adaptor carried by said manually operable shaft for coupling a portion of said mechanical connection means to the latter, a pressure reaction chamber situated on either axial side of said adaptor, a reaction element disposed within each of said reaction chambers, passage means for separately conducting pressurized fluid from separate ones of said working chambers to each of said working chambers, said reaction element being adapted to oppose an axial shifting movement of said manually operable shaft in either direction and valve means disposed in said passage means for limiting the magnitude of the fluid pressure in a pressurized reaction chamber when the fluid pressure in the corresponding pressurized working chamber exceeds a predetermined magnitude.

2. A power boosting mechanism comprising a cylinder, a piston member disposed within said cylinder to define a pair of opposed working chambers, a manually operable shaft threadably connected to said piston member and extending axially from said cylinder, said manually operable shaft being adapted to shift axially between predetermined limits upon rotation thereof relative to said piston member, fluid pressure passage means having portions communicating with each of said working chambers, valve means partly defining said passage means for selectively distributing fluid pressure to each of said working chambers, means forming a mechanical connection between movable portions of said valve means and said manually operable shaft, a first pressure reaction element positioned adjacent one axial side of said mechanical connection means, a second pressure reaction element positioned adjacent the other axial side of said mechanical connection, first passage means for conducting fluid pressure from one of said working chambers to one side of said first reaction elements, second passage means for conducting fluid pressure to one side of the second reaction elements, said reaction elements being adapted to engage a portion of said mechanical connection means to oppose axial shifting movement of said manually operable shaft during rotation of the latter relative to said piston member.

3. A power boosting mechanism comprising a cylinder, a piston member disposed within said cylinder to define a pair of opposed working chambers, a manually operable shaft threadably connected to said piston member and extending axially through one working chamber to the exterior of said cylinder, said manually operable shaft being adapted to shift axially between predetermined limits upon rotation thereof relative to said piston member, conduit means for conducting pressurized fluid to each of said working chambers, valve means disposed transversely with respect to the axis of said cylinder for selectively controlling the distribution of fluid pressure from said conduit means to each of said working chambers, said valve means defining in part said conduit means, means forming a mechanical connection between said valve means and said manually operable shaft for transmitting axial shifting motion of the latter to the former, separate pressure reaction elements acting upon each of the opposed sides of portions of said mechanical connection means, and separate passage means for conducting pressurized fluid from said one working chamber to said one side of a first of said reaction elements and for conducting pressurized fluid from the other working chamber to one side of a second of said reaction elements, the effective area of said first reaction element being greater than the area of said second reaction element.

4. A power boosting mechanism comprising a cylinder, a piston member disposed within said cylinder to define a pair of opposed working chambers, a manually operable shaft threadably connected to said piston member, said manually operable shaft being adapted to shift axially between predetermined limits upon rotation thereof relative to said piston member, conduit means for conducting pressurized fluid to each of said working chambers, valve means disposed transversely with respect to the axis of said cylinder for selectively controlling the distribution of fluid pressure from said conduit means to either of said working chambers, means for coupling said valve means with said manually operable shaft for transmitting the axial shifting motion from the latter to said valve means to actuate the same, annular grooves comprising pressure reaction chambers formed about the axis of said cylinder on opposed sides of said coupling means and relatively stationary portions of said mechanism, a flexible seal element disposed in each of said annular pressure reaction chambers, said seal element having a transversely extending section with radially spaced inner and outer peripheral edges, a reaction ring positioned adjacent each of said seals intermediate the inner and outer peripheral edges thereof, and separate fluid passage means for conducting pressurized fluid from one working chamber to one of said reaction chambers and from the other working ing chamber to the other of said reaction chambers, said pressure reaction elements being adapted to engage portions of said coupling means to resist axial shifting movement of said manually operable shaft during rotation of the latter, the magnitude of said resistance being proportional to the magnitude of the fluid pressure existing within said working chambers.

5. The structure as set forth in claim 4 wherein each of said seals is characterized by a channel cross section with an outer peripheral edge contacting the radially outer wall of its associated reaction chamber and an inner peripheral edge contacting a radially inward wall of said reaction chamber, said reaction elements being adapted to axially deflect the section of said seal intermediate the radially inner and outer peripheral edge thereof upon axial shifting movement of said manually operable shaft.

6. The structure as set forth in claim 5 wherein said reaction chamber includes means for maintaining the inner and outer peripheral edges of said seals in a fixed axial position during shifting movement of said reaction elements.

7. A power boosting mechanism comprising a cylinder, a piston member within said cylinder defining a pair of opposed working chambers, a manually operable shaft threadably connected to said piston member, said manually operable shaft being adapted to shift axially between predetermined limits upon rotation thereof relative to said piston member, conduit means for conducting pressurized fluid to each of said working chambers, valve means for selectively distributing fluid pressure from said conduit means to each of said working chambers, a mechanical connection between said manually operable shaft and said valve means for actuating the latter in response to axial shifting movement of the former, and means for resiliently urging said manually operable member in a direction tranverse to the axis of said cylinder.

8. A power boosting mechanism comprising a cylinder, a piston member disposed within said cylinder to define a pair of opposed working chambers, a manually operable shaft threadably connected to said piston member, a driven member powered by said piston member, said manually operable shaft extending axially through one of said working chambers to the exterior of said cylinder, a relatively stationary cylinder closure means surrounding said manually operable shaft, said closure member being formed with a predetermined radial clearance between the same and said shaft, and means for biasing said shaft in the vicinity of said closure means in a transverse direction to eliminate free play in the threaded connection between said manually operable shaft and said piston member.

9. In a power boosting mechanism a cylinder, a piston member disposed within said cylinder, a cylinder closure means transversely disposed across one axial end of said cylinder, a manually operable shaft threadably connected to said piston member and extending axially through said closure means, and means situated in the vicinity of said closure means for biasing said manually operable shaft in a transverse direction, said closure means providing a radial clearance about said manually operable shaft to accommodate misalignment of the latter with respect to the axis of said cylinder.

10. In a power boosting mechanism a fluid cylinder, a piston disposed within said cylinder, a manually operable member extending axially through said cylinder on one side of said piston member, a cylinder closure means situated at one end of said cylinder, said manually operable member extending through said closure means, one of said members having an internal helical groove formed therein, the other of said members being provided with an external helical groove, the latter member being adapted to be received within the former member, a spaced pair of recirculating ball circuits each comprising a series of spherical balls situated in said internal and external grooves to provide a recirculating ball-nut assembly, and means for biasing said manually operable member in a transverse direction to produce radially directed forces in each of said ball circuits.

11. A power boosting mechanism comprising a cylinder, a piston member disposed in said cylinder to define a pair of opposed working chambers, means for conducting fluid pressure to either of said working chambers, a shaft member threadably connected to said piston member and extending axially from one side of said cylinder, a closure means situated adjacent said one end of said cylinder in surrounding relationship with respect to said shaft member, the entire transverse opposed axial sides of said piston member being adapted to be exposed to said fluid pressure, and means for biasing said shaft member in a transverse direction at a point axially spaced from its threaded connection with said piston member.

12. A power boosting mechanism comprising a cylinder, a piston member disposed in said cylinder to define a pair of opposed working chambers, said piston member being provided with a hollow internally threaded interior with one closed end, an externally threaded shaft threadably received within said hollow interior and extending from the other side of said piston member, and means for biasing said shaft in a transverse direction to provide misalignment between the axis of said shaft with respect to the axis of said cylinder to compensate for free play in the threaded connection between said piston member and said shaft.

13. In a power boosting mechanism, a cylinder, a piston means slidably disposed within said cylinder to define a pair of opposed fluid working chambers, a toothed rack gear formed on a portion of said piston means, a toothed sector gear intermeshed with said rack gear in driving engagement therewith, a driven member connected to said sector gear, the intermeshing portions of said gears being tapered transversely of the axis of said cylinder to prevent relative movement of said gears with respect to each other in one direction transversely of said axis, fluid conduit means for conducting pressurized fluid to said chambers, a means in communication with said conduit means for applying said pressurized fluid against said sector gear to urge the latter in said one direction to maintain a constant driving engagement between said gears.

14. In a power boosting mechanism, a casing, a cylinder defined by said casing, a piston means slidably disposed within said cylinder to define a pair of opposed working chambers, a rack gear drivably connected to said piston means and having axially spaced teeth, a driving member drivably connected to said piston means, a rocker shaft disposed transversely with respect to the axis of said cylinder, a sector gear carried by one end of said rocker shaft, and intermeshed with said rack gear, the intermeshing portions of said gears being tapered transversely of said axis and interfitting to limit movement of said sector gear in one direction transversely of said axis, conduit means for conducting pressurized fluid to said chambers, means in communication with one of said chambers for applying said pressurized fluid against said sector gear to urge the same in said one direction to maintain said sector gear in driving engagement with said rack gear, a manually adjustable member threadably received in a portion of said casing, a shoulder formed on said manually adjustable member, and anchor means carried by said sector gear, the latter being adapted to engage said shoulder and to limit the displacement of said sector gear oppositely to said one transverse direction.

15. A power steering mechanism comprising a casing, a cylinder defined by said casing, a hollow piston structure slidably disposed within said cylinder, internal helical grooves formed in the hollow interior of said piston structure, a manually operable driving shaft having an externally formed helical groove portion received within the hollow interior of said piston structure, an axially spaced pair of recirculating ball circuits having spherical balls received within each of said helical grooves to form a recirculating ball nut assembly, said driving shaft extending from one side of said piston structure in the direction of the axis of said cylinder, and spring means for biasing said driving shaft in a transverse direction with respect to said cylinder axis, said spring means acting on the extended end of said driving shaft thereby creating a force couple in the vicinity of said recirculating ball nut assembly, with separate ones of the forces of the couple acting on each of the ball circuits.

16. A power steering mechanism comprising a casing, a cylinder defined by said casing, hollow piston structure slidably disposed in said casing and drivably connected to a driven member, a manually operable driving shaft rotatably received within the hollow interior of said piston structure, said driving member and the hollow interior of said piston structure each having a portion formed with helical grooves, spherical balls received within said grooves to form a recirculating ball nut assembly, said balls being arranged in a pair of axially spaced circuits, said driving member being adapted to exert an axial driving force on said piston structure upon rotation thereof, lost motion means for accommodating an axial shifting movement within predetermined limits of said driving member upon rotation thereof in either direction, and spring means for biasing said driving member in a transverse direction, said spring means acting at a point axially spaced from said recirculating ball nut assembly.

17. In a power steering mechanism, a cylinder, a piston slidably disposed within said cylinder to define a pair of opposed fluid working chambers, a driving shaft threadably connected to said piston and extending axially to one of said working chambers, the effective working area of said piston on either side thereof being substantially equal to the transverse cross sectional area of said cylinder, conduit means for conducting fluid pressure to each of said working chambers, valve means partly defining said conduit means for selectively distributing fluid pressure to alternate ones of said working chambers, said valve means including a movable valve element for selectively restricting portions of said conduit means to accomplish the aforesaid fluid distributing function, means for actuating said valve element including a valve actuator element coupled at one end thereof to said driving member, lost motion means for accommodating a shifting movement of said driving member within predetermined limits to shift said actuator element in either axial direction, and spring means acting on said driving member in the vicinity of said lost motion means for biasing said driving member in a transverse direction.

18. A power boosting mechanism comprising a pressure chamber, a reciprocable pressure actuated member in said chamber, manually operable means, means operatively connecting said pressure actuated member and manually operable means to operate the latter upon operation of said pressure actuated member, means for applying pressurized fluid to either side of said member and for exhausting said fluid from the opposite side thereof comprising an operative fluid conduit system containing said chamber and having pressure inlet means and pressure exhaust means, valve means including a shiftable valve element for selectively connecting said inlet means to said chamber at either side of said member and connecting said exhaust means to said chamber at the opposite side of said member, a valve actuator interconnecting said valve element and manually operable means for shifting said element in response to operation of said manually operable means, means for maintaining a predetermined fluid back pressure in said exhaust means, and means operatively connected with said exhaust means for applying pressure to said valve element to bias the latter in a predetermined direction.

19. A power boosting mechanism comprising a pressure chamber, a reciprocable pressure actuated member in said chamber, manually operable means, means operatively connecting said pressure actuated member and manually operable means to operate the latter upon operation of said pressure actuated member, means for applying pressurized fluid to either side of said member and for exhausting said fluid from the opposite side thereof comprising an operative fluid conduit system containing said chamber and having pressure inlet means and pressure exhaust means, operative valve means for selectively connecting said inlet means to said chamber at either side of said member and connecting said exhaust means to said chamber at the opposite side of said member, said valve means including a housing member and an inner member, one of said members being shiftable with respect to the other, a valve actuator interconnecting said manually operable means and the shiftable member of said valve means for shifting the latter in response to operation of said manually operable means, means for maintaining a predetermined fluid back pressure in said exhaust means, and means for applying said back pressure to said shiftable member to bias the latter in a predetermined direction.

20. A power boosting mechanism comprising a cylinder, a piston member disposed within said cylinder, a manually operable shaft, means interconnecting said piston member and shaft to operate the latter upon shifting of the former, a pressure passage means having portions extending to either side of said piston member, valve means for selectively distributing fluid pressure from said pressure passage means to either side of said piston member, means forming a mechanical connection between portions of said valve means and said manually operable shaft for transmitting shifting movement of the latter to the former, pressure reaction elements acting on portions of said mechanical connection means, fluid passage means for conducting pressurized fluid from one side of said piston member to one side of one of said reaction elements, other passage means for conducting fluid pressure from the other of said working chambers to the other of said reaction elements.

21. The combination according to claim 20 and having valve means in said passage means for limiting the magnitude of the fluid pressure in a reaction chamber when the fluid pressure in the corresponding working chamber exceeds a predetermined magnitude.

22. A power boosting mechanism comprising a pressure chamber, a shiftable pressure actuated member in said chamber, manually actuated means operatively connected with said member to shift the same, an operative fluid conduit system containing said chamber for conducting pressurized fluid thereto, valve means in said system including a shiftable valve element for selectively controlling the distribution of said fluid to said chamber, shiftable coupling means operatively connecting said valve element and manually actuated means to shift the former upon actuation of the latter, a pressure reaction chamber in a relatively fixed portion of said mechanism and opening toward a portion of said coupling means, a sealing element of flexible material disposed across the opening of said reaction chamber adjacent said portion of said coupling means and having flanged edges engaging the sides of said reaction chamber, a reaction member interposed between said sealing element and said portion of said coupling means in the path of shifting of the latter to oppose said shifting, and fluid passage means in said system interconnecting said pressure and reaction chambers to urge said sealing element against said reaction member with a force comprising a function of the fluid pressure in said pressure chamber.

23. The combination according to claim 22 wherein said flanged edges are directed into said reaction chamber and are held against the sides thereof by the fluid pressure in the latter chamber, and wherein the opening of said reaction chamber is restricted around the marginal portions of said sealing element to limit movement of said marginal portions from said reaction chamber.

24. A power boosting mechanism comprising a pressure chamber, a shiftable pressure actuated member in said chamber, manually actuated means operatively connected with said member to shift the same, an operative fluid conduit system containing said chamber for conducting pressurized fluid thereto, valve means in said system including a shiftable valve element for selectively controlling the distribution of said fluid to said chamber, a coupling lever mounted on a relatively fixed portion of said mechanism for swinging movement and having one swinging portion operatively connected with said valve element to shift the same, an adaptor operatively connected with said manually actuated means to shift therewith and engaging another swinging portion of said lever to swing the latter and thereby shift said valve element, a pressure reaction chamber recessed into a relatively fixed portion of said mechanism and opening toward said adaptor, a sealing element of flexible material disposed across the opening of said reaction chamber and having flanged edges directed into said reaction chamber and frictionally engaging the sides thereof, a reaction member interposed between said sealing element and adaptor in the path of shifting of the latter to oppose said shifting, said mechanism having a relatively fixed portion limiting movement of said reaction member toward said adaptor, and fluid passage means in said system interconnecting said pressure and reaction chambers to urge said sealing element against said reaction member and to urge said flanged edges against the sides of said reaction chamber with a force comprising a function of the fluid pressure in said pressure chamber.

25. The combination according to claim 24 wherein relatively fixed portions of said mechanism engage the marginal portions of said sealing element to limit movement of said marginal portions from said reaction chamber.

26. In a power boosting mechanism, a fluid actuated member shiftable within a pressure chamber, a first gear operatively connected to said member to be driven thereby, a second gear meshed with said first gear to be driven thereby in a given direction, the intermeshing portions of said gears being tapered transversely of said given direction and interfitting to limit relative movement of said gears with respect to each other in one direction transversely to said given direction, conduit means for conducting pressurized fluid to said chamber, and means for applying said pressurized fluid to at least one of said gears to urge said relative movement thereof in said one direction.

References Cited in the file of this patent
UNITED STATES PATENTS

| | | |
|---|---|---|
| 2,410,049 | Davis | Oct. 29, 1946 |
| 2,682,778 | Creson et al. | July 6, 1954 |